United States Patent
Essers et al.

(10) Patent No.: US 12,240,950 B2
(45) Date of Patent: Mar. 4, 2025

(54) POLYMER COMPOSITION FOR IMPROVED GRADE PLASTICS FROM RECYCLED MATERIAL

(71) Applicant: QCP HOLDING B.V., Geleen (NL)

(72) Inventors: Franciscus Elisabeth Jacobus Essers, Geleen (NL); Martinus Hendrikus Maria Van Enckevort, Geleen (NL); Marc Peter August Houtermans, Geleen (NL); Johannes Venerius, Geleen (NL)

(73) Assignee: QCP Holding B.V., Geleen (NL)

(*) Notice: Subject to any disclaimer, the term of this patent is extended or adjusted under 35 U.S.C. 154(b) by 656 days.

(21) Appl. No.: 17/607,482

(22) PCT Filed: Apr. 28, 2020

(86) PCT No.: PCT/EP2020/061759
§ 371 (c)(1),
(2) Date: Oct. 29, 2021

(87) PCT Pub. No.: WO2020/221747
PCT Pub. Date: Nov. 5, 2020

(65) Prior Publication Data
US 2022/0220275 A1 Jul. 14, 2022

(30) Foreign Application Priority Data
Apr. 29, 2019 (EP) .................... 19171539

(51) Int. Cl.
*C08J 11/06* (2006.01)

(52) U.S. Cl.
CPC .......... *C08J 11/06* (2013.01); *C08J 2323/12* (2013.01)

(58) Field of Classification Search
USPC ....................................... 521/40.5
See application file for complete search history.

(56) References Cited

U.S. PATENT DOCUMENTS

2016/0136853 A1  5/2016  Dinunzio

FOREIGN PATENT DOCUMENTS

| CN | 108912487 A | * 11/2018 | ............. C08L 23/12 |
| JP | H7-258486 A | 10/1995 | |
| KR | 10-1383621 B1 | 4/2014 | |
| KR | 1383621 B1 | * 4/2014 | ................ C08J 3/22 |

OTHER PUBLICATIONS

CN-108912487-A Machine Translation (Year: 2018).*
KR-1383621-B1 Machine Translation (Year: 2014).*

* cited by examiner

*Primary Examiner* — Terressa Boykin

(57) ABSTRACT

A polymer composition of:
a. 50-96 wt % of a recycled polypropylene;
b. 4-50 wt % of talcum;
e. 0-10 wt % of additives; wherein the additives are PEs, PE-MAs, PP-MAs, stabilizers, peroxides, CaOs or colorants;
wherein the talcum has a D50 of less than 4 micron (ISO13317-3) and wherein the wt % is relative to the total weight of the polymer composition 50-90 wt % of a recycled polypropylene.

20 Claims, No Drawings

POLYMER COMPOSITION FOR IMPROVED GRADE PLASTICS FROM RECYCLED MATERIAL

FIELD OF THE INVENTION

The present invention relates to an improved polymer composition containing a high amount of recycled polypropylene (PP) and a high amount of, preferably unmodified, talcum. As well as to the use of such polymer composition in the manufacturing of articles, the articles manufactured from said polymer composition and to the process of preparing such polymer composition.

BACKGROUND OF THE INVENTION

The omnipresence of plastic packaging and the importance of environmental policy have led to the increased importance of recycled plastic materials. The recycling of paper, textiles, glass or metals is already carried out on a large scale, whether by separate collection r by sorting of the recyclate. The recycling of plastic waste and re-use of plastics is also increasing.

Virgin polymer composition replacement is considered to represent the only way forward to solve the global plastic waste problem, to stop the depletion of natural resources, and to facilitate a circular economy.

To-date recycled polymer compositions are available, in the form of flakes or granules, that are obtained from the collection of PP packagings, containers or films are available on the market, wherein the recycled PP is present within the recycled polymer composition at a low percentage of between 5-8 wt % and the remaining between 92-95 wt % of PP are made-up of virgin PP.

The aim of the invention is to produce a polymer composition containing a high amount of recycled PP and a high amount of talcum that can compete with virgin material with respect to product performance and price. To-date polymer compositions of recycled PP and talcum cannot compete with the impact strength and stiffness of comparable virgin PP and talcum compositions. Standard virgin PP and talcum compositions have a Tensile stiffness between 1970-2570 MPa and Charpy Notched Impact strength of between 2.5-15.5 kJ/m$^2$. The currently available polymer compositions of recycled PP and talcum suffer from polystyrene contaminants, rubber contaminants and variability and poor consistency of the recycled plastic feeds. Subsequently the currently available polymer compositions of recycled PP and talcum have a low impact strength and stiffness when compared to virgin materials.

It is a further aim of the invention to produce a polymer composition of recycled PP and talcum that can be used to manufacture blow-molded and injection molded packagings as well as durable products without need for further blending with virgin PP material.

There is currently no known polymer composition containing a high percentage of recycled PP (such as 50-90 wt % preferably 55-87.5 wt %, most preferably 60-85 wt %, within the polymer composition) with properties fit for consumer products, manufactured through processes such as for example blow-molding and injection molding, and with a high impact strength and stiffness.

The source of materials for polymer composition of recycled polymer material can be food and household goods packaging, e.g. polyolefin plastics (such as for example PP) that can be contaminated by other polymer families, such as for example styrene polymers.

Styrene polymers are used in the production of packagings and containers for perishable foods, in the form of polystyrene (PS); in the production of industrial packagings, in the form of acrylonitrile butadiene styrene (ABS); in the production of packagings, containers and as fillers for packaging and containers, in the form of expanded polystyrene (EPS). Thus, styrene polymers need to be removed during the processing of the to be recycled materials. A complete removal is technically and economically not possible. But any remaining residual polystyrene has a significant negative impact on the mechanical properties of the recycled PP and talcum polymer composition. EPS for example accelerates radical generation and therewith material degradation, and renders articles manufactured more brittle. Further, polyethylene terephthalate (PET) has a negative impact on the mechanical properties of the polymer composition.

Polyvinyl chloride (PVC), polyvinylidene chloride (PVDC) and styrene polymers are considered to be only partially compatible with PP, especially when recycling to produce a new recycled PP and talcum composition using extrusion.

The coexistence of significant percentages of other polymer contaminants together with PP coming from recycled packagings has to be accepted, in order to make available a polymer flake or granule from recycling at competitive costs with respect to virgin PP and talcum.

An additional problem in the use of recycled PP in a recycled PP and talcum polymer composition, particularly from recycled packaging, is the variability and poor consistency of the polymer in the feed. Thus, this variability and poor consistency is also found within the regenerated granule or flake and produced articles. This variability and poor consistency of the polymer leads to an aesthetically unacceptable surface and inconstant mechanical properties of the final products. At the same time, the use of said granules in injection molding processes is limited or prevented by the extreme brittleness, low impact strength and stiffness of granules or flakes and products obtained from recycling.

SUMMARY OF THE INVENTION

It is an object of the present invention to solve at least one of the above-listed problems. Further object of the invention is to obtain a polymer composition that can be efficiently used in the molding processes, particularly injection molding, wherein the percentage of recycled PP within the polymer composition is high, such as 50-90 wt %, preferably 55-87.5 wt %, most preferably 60-85 wt %, in the polymer composition. The polymer composition can be used to produce flakes r granules and products at competitive costs with high impact strength and stiffness, when compared to virgin PP and talcum products. The polymer composition can produce a product that has a high impact strength (Charpy) and has increased stability upon exposure to environment.

A polymer composition consisting of:
 a. 50-96 wt % of a recycled polypropylene;
 b. 4-50 wt % of talcum;
 c. 0-10 wt % of additives; wherein the additives are selected from the group of polyethylenes (PEs), maleic anhydride grafted PEs (PE-MAs), maleic anhydride grafted PPs (PP-MAs), stabilizers, peroxides, calcium oxides (CaOs) or colorants;
wherein the talcum has a D50 of less than 4 micron (ISO13317-3) and wherein wt % is relative to the total weight of the polymer composition.

The recycled PP and, preferably unmodified, talcum polymer composition according to the invention has an increased impact strength and stiffness compared to standard recycled PP and talcum compositions, despite contamination with other polymers. The polymer composition of the invention can have a melt flow rate sufficient for efficient injection molding.

Advantages of the invention are usability of the polymer composition for molding, especially injection molding, increased MFR, reduced need for peroxides, increased impact strength and stiffness relative to other recycled PP and talcum compositions.

DETAILED DESCRIPTION OF THE INVENTION

The polymer composition consists of a high amount of a recycled polypropylene, preferably unmodified, talcum and additives.

Recycled Polypropylene

The PP raw material comprises plastic waste, predominantly post-consumer waste (PCW) PP packaging waste, such as for example detergent and shampoo bottles, dairy pots and meat trays, etc. The PP raw material waste can be pre-sorted by waste management companies. One suitable PP source can for example be the waste material collected under the DSD324 (05-2012) and DSD324-1 standard (02-2016).

The PP DSD324 (05-2012) raw material can comprise at least one of the following used, residue-drained, rigid, system-compatible items made of polypropylene, e.g. bottles, cups and trays, incl. secondary components such as lids, labels etc. The PP DSD324 (05-2012) raw material can comprise a maximum total amount of impurities 6% by mass. The impurities in the PP DSD324 (05-2012) raw material can comprise other metal items <0.5% by mass, rigid PE items <1% by mass, expanded plastics incl. EPS items <0.5% by mass, plastic films <2% by mass and other residues <3% by mass. Further examples of impurities in PP DSD324 (05-2012) raw material can comprise glass, paper, board, cardboard, composite paper/cardboard materials (e.g. liquid packaging boards), aluminised plastics, other materials (e.g. rubber, stones, wood, textiles, nappies) and compostable waste (e.g. food, garden waste).

A second standard for recycled PP is the PP DSD324-1 standard (03-2018). This standard is very comparable to the PP DSD324 standard discussed above, except that the recycled PP can contain more film material, up to about 10 wt %. This film material comprises both recycled PP film (such as for example bioriented PP (BOPP)) PE film. The PP 5D324-1 standard (03-2018) raw material can comprise a maximum total amount of impurities 4% by mass. The impurities in the PP DSD324-1 standard (03-2018) raw material can comprise other metal items <0.5% by mass, rigid PE items <1% by mass, expanded plastics incl. EPS items <0.5%© by mass, paper, cardboard, carton, composite paper/cardboard materials (e.g. liquid packaging boards) <1% by mass, other residues <3% by mass. Further examples of impurities in PP DSD324-1 standard (03-2018) raw material can comprise glass, aluminised plastics, other materials (e.g. rubber, stones, wood, textiles, nappies) and compostable waste (e.g. food, garden waste).

Examples of recycled PP are EXPP152A (MFR 15)/300P and EXPP163A (MFR 50)/300T.

Optical sorting can also be used to remove unwanted polymers, but polystyrene or PE contamination in the feed still occurs and has a substantial negative impact on the mechanical properties of the recycled polymer composition.

PP is available in three different varieties, PP homopolymers (PPh), PP random copolymer (PPr) and PP impact copolymer (or heterophasic PP copolymer, PPc).

The waste material can for example be characterized as originating from following sources (a) extrusion sheet and film material, mostly PP homopolymers (PPh) and PP random copolymers (PPr), virtually without rubber (such as for example biaxially-oriented polypropylene (BOPP)); and (b) injection molded material, which are a mix of PP homopolymer (PPh), PP random copolymers (PPr) and impact copolymer (PPc), containing about 15 wt % rubber.

The recycled PP can contain approximately half of packaging material (BOPP) and half of rubber-containing injection molded material. This injection molded material can contain rubbers, such as for example C2-C3 rubber, thermoplastic elastomers (TPE), ethylene propylene diene methylene (EPDM) or ethylene propylene rubber (EPR).

The resulting mix of the recycled PP itself used in the polymer composition can for example have a rubber content of between 1.5-12 wt % (rubber from rubber-containing injection molded material, as determined with cold xylene solubles (CXS); wherein wt % is relative to the total amount of the mix of the recycled PP).

The recycled PP content of the polymer composition is preferably made-up of between 25-75 wt % BOPP and between 75-25 wt % rubber-containing injection molded material; wherein wt % is relative to the total amount of recycled PP.

The recycled PP is preferably present between 50-96 wt %, more preferably between 50-90 wt %, or between 55-87.5 wt %, most preferably between 60-85 wt %, within the polymer composition. The wt % is relative to the total weight of the polymer composition, if not stated otherwise.

Talcum

The talcum is preferably unmodified. Preferably, the talcum does not have a surface coating or did not have surface treatment. The talcum is a very finely ground talc. The inventors found that use of a normal talc, having a relatively large particle size (for example a particles size D50 of 10 micron (ISO 13317-3) gives a low modulus and low impact. However use of a fine talc having a D50 of less than 4 micron, preferably less than 3 micron, even more preferably less than 2.5 micron gives an increase in impact and tensile modulus in combination with a recycle PP. The D50 is measured by sedigraph, sedimentation analysis, Stokes Law (ISO 13317-3).

The talcum can be for example an alpha nucleating agent, such as for example hydrated magnesium-silicate, like Steamic 008 DF or Imerys T1DF.

The talcum increases the stiffness and strength of the polymer composition and produced articles. The talcum amount further impacts the flow of the polymer composition in the molding process, especially in regards to thin walled applications.

The talcum is preferably present at least 4 wt %, more preferably at between 10-50 wt %, even more preferably at between 15-45 wt %, most preferably at between 20-40 wt %, within the polymer composition.

Additives

The additives are preferably present between 0-10 wt %, preferably 0.05-9 wt %, within the polymer composition.

Additives comprise PEs, PE-MAs, PP-MAs, stabilizers, peroxides, CaOs or colorants.

Examples of PEs are High-Density PE (HOPE), Low-Density PE (LOPE) and Linear Low-Density PE (LLDPE).

A PP compatible acid having a polar group can be added, such as for example a PP-MA.

A PE-MA, PE r PP-MA can be added to the polymer composition between 0.1-2 wt %, preferably between 0.2-1 wt %, most preferably between 0.4-0.8 wt %.

A stabilizer can be added, such as for example masterbatches like Tosaf ME 833848, which is a blend of about 70 wt % LDPE with a phenolic stabilizer and an Irgafos. The stabilizer may for example be added between 0.01-2 wt %, preferably between 0.05-1.5 wt %.

A peroxide, in the form of an organic compound or masterbatch can be added. The peroxide improves the flow of the material. The peroxide can be selected from the group of Zebraflow 1028, Zebraflow T0214 or Zebraflow 10318. The peroxide can for example be used to shorten the polymer chains thereby lowering viscosity and improving flow. For example, between 0.05-2 wt % of masterbatch can be added, wherein this masterbatch can contain for example between 2-10 wt % of a suitable peroxide.

A CaO can be added to inhibit release of HCl. The CaO can be also added as a masterbatch with for example LDPE. CaO can for example be added in a range between 0-2 wt %, preferably between 0.05-1.5 wt %.

A colorant, such as for example black, can be added to the polymer composition between 0.1-5 wt %, preferably between 1-3 wt % in the form of a masterbatch blend.

Composition

The composition according to the present invention has surprisingly good mechanical properties.

The polymer composition has preferably a melt flow rate MFR (230° C., 2.16 kg) of between 2.5-22.5 g/10 min, more preferably between 9.5-16.5 g/10 min and/or preferably an MVR (230° C., 2.16 kg) of between 5-25 ml/10 min, more preferably between 10-20 ml/10 min; determined using ISO 1133-1:2011.

The polymer composition has preferably a modulus ranging between 1500-2600 MPa, more preferably between 1970-2570 MPa, more preferably between 2170-2370 MPa, determined using the ISO 527-2:2012, T=23° C.

The polymer composition has preferably a Charpy notched impact strength of between 2.5-15.5 kJ/m$^2$, more preferably between 3.5-10.5 kJ/m$^2$; determined using ISO 179-1:2010, T=23° C., II, molded bar 527/1A—notched.

Process

The invention further relates to a process for preparing the polymer composition of the invention.

This process comprises the steps of
a) treating a mixed polyolefin recyclate fraction with water without added thermal energy;
b) treating the solution obtained mixed polyolefin recyclate fraction from a) in a washing step with an alkaline medium at a temperature of at least 60° C.;
c) sorting of the mixed polyolefin recyclate fraction solution obtained from b) obtaining a mixed PP recyclate fraction, wherein steps a) and b) can also be carried out in the reverse order;
d) treating the mixed PP recyclate fraction solution obtained from the above steps at a temperature in the range of between 50-155° C., preferably for a period of at least 60 minutes;
e) adding the dried mixed PP recyclate fraction obtained from step d) to an extruder with the addition of, talcum and additives; wherein the mix is processed to obtain a recycled PP and talcum material.
wherein step e) is conducted between 200-250° C., preferably between 210-240° C., most preferably between 220-230° C. for between 1-10 minutes.

The process of making the polymer composition may comprise compounding and extruding.

The process of making the polymer composition may use a co-rotating twin screw tandem extruder to which the recycled polypropylene, talcum and additives are added.

Additives can be added in a reclaim extruder (first extruder) and a compounding extruder (second extruder) of a tandem extruder.

Articles

The polymer composition can be presented in granule or flake form to be used for manufacturing articles.

The polymer composition of recycled PP and talcum is suitable for manufacturing products for long-term use, such as for example boxes, trays, paint pails or consumer goods.

The polymer composition of recycled PP and talcum is suitable for manufacturing in the automotive industry, especially under the bonnet applications (complying to VW TL 44045).

The polymer composition of recycled PP and, preferably unmodified, talcum has shown increased heat stability, reflected in a heat aging resistance at 150° C. for >800 hours, determined in accordance with VW TL 44045 paragraph 5.14.

The articles made from the polymer composition are preferably formed by injection molding or blow-molding.

EMBODIMENTS

In a preferred embodiment the polymer composition consists of between 50-90 wt % of a recycled polypropylene, between 10-50 wt % of talcum and between 0-10 wt % of additives; wherein the talcum has a D50 of less than 4 micron (ISO13317-3) and wherein the additives are selected from the group of polyethylenes (PEs), maleic anhydride grafted PEs (PE-MAs), maleic anhydride grafted PPs (PP-MAs), stabilizers, peroxides, calcium oxides (CaOs) or colorants.

In another embodiment the polymer composition consists of between 55-85 wt % of a recycled polypropylene, between 10-50 wt % of talcum and between 0-10 wt % of additives; wherein the talcum has a D50 of less than 4 micron (ISO13317-3) and wherein the additives are selected from the group of polyethylenes (PEs), maleic anhydride grafted PEs (PE-MAs), maleic anhydride grafted PPs (PP-MAs), stabilizers, peroxides, calcium oxides (CaOs) or colorants.

In another embodiment the polymer composition consists of between 60-80 wt % of a recycled polypropylene, between 10-50 wt % of talcum and between 0-10 wt % of additives; wherein the talcum has a D50 of less than 4 micron (ISO13317-3) and wherein the additives are selected from the group of polyethylenes (PEs), maleic anhydride grafted PEs (PE-MAs), maleic anhydride grafted PPs (PP-MAs), stabilizers, peroxides, calcium oxides (CaOs) or colorants.

In another embodiment the polymer composition consists of between 50-90 wt % of a recycled polypropylene, between 15-45 wt % of talcum and between 0-10 wt % of additives; wherein the talcum has a 50 of less than 4 micron (ISO13317-3) and wherein the additives are selected from the group of polyethylenes (PEs), maleic anhydride grafted PEs (PE-MAs), maleic anhydride grafted PPs (PP-MAs), stabilizers, peroxides, calcium oxides (CaOs) or colorants.

In another embodiment the polymer composition consists of between 55-85 wt % of a recycled polypropylene, between 15-45 wt % of talcum and between 0-10 wt % of additives; wherein the talcum has a D50 of less than 4 micron (ISO13317-3) and wherein the additives are selected from the group of polyethylenes (PEs), maleic anhydride grafted PEs (PE-MAs), maleic anhydride grafted PPs (PP-MAs), stabilizers, peroxides, calcium oxides (CaOs) or colorants.

In another embodiment the polymer composition consists of between 60-80 wt % of a recycled polypropylene, between 15-45 wt % of talcum and between 0-10 wt % of additives; wherein the talcum has a D50 of less than 4 micron (ISO13317-3) and wherein the additives are selected from the group of polyethylenes (PEs), maleic anhydride grafted PEs (PE-MAs), maleic anhydride grafted PPs (PP-MAs), stabilizers, peroxides, calcium oxides (Cans) or colorants.

In another embodiment the polymer composition consists of between 50-90 wt % of a recycled polypropylene, between 20-40 wt % of talcum and between 0-10 wt % of additives; wherein the talcum has a D50 of less than 4 micron (ISO13317-3) and wherein the additives are selected from the group of polyethylenes (PEs), maleic anhydride grafted PEs (PE-MAs), maleic anhydride grafted PPs (PP-MAs), stabilizers, peroxides, calcium oxides (CaOs) or colorants.

In another embodiment the polymer composition consists of between 55-85 wt % of a recycled polypropylene, between 20-40 wt % of talcum and between 0-10 wt % of additives; wherein the talcum has a D50 of less than 4 micron (ISO13317-3) and wherein the additives are selected from the group of polyethylenes (PEs), maleic anhydride grafted PEs (PE-MAs), maleic anhydride grafted PPs (PP-MAs), stabilizers, peroxides, calcium oxides (CaOs) or colorants.

In another embodiment the polymer composition consists of between 60-80 wt % of a recycled polypropylene, between 20-40 wt % of talcum and between 0-10 wt % of additives; wherein the talcum has a D50 of less than 4 micron (ISO13317-3) and wherein the additives are selected from the group of polyethylenes (PEs), maleic anhydride grafted PEs (PE-MAs), maleic anhydride grafted PPs (PP-MAs), stabilizers, peroxides, calcium oxides (CaOs) or colorants.

In another embodiment the polymer composition consists of between 50-90 wt % of a recycled polypropylene, between 10-50 wt % of talcum and between 0.05-9 wt % of additives; wherein the talcum has a D50 of less than 4 micron (ISO13317-3) and wherein the additives are selected from the group of polyethylenes (PEs), maleic anhydride grafted PEs (PE-MAs), maleic anhydride grafted PPs (PP-MAs), stabilizers, peroxides, calcium oxides (CaOs) or colorants.

In another embodiment the polymer composition consists of between 55-85 wt % of a recycled polypropylene, between 10-50 wt % of talcum and between 0.05-9 wt % of additives; wherein the talcum has a D50 of less than 4 micron (ISO13317-3) and wherein the additives are selected from the group of polyethylenes (PEs), maleic anhydride grafted PEs (PE-MAs), maleic anhydride grafted PPs (PP-MAs), stabilizers, peroxides, calcium oxides (CaOs) or colorants.

In another embodiment the polymer composition consists of between 60-80 wt % of a recycled polypropylene, between 10-50 wt % of talcum and between 0.05-9 wt % of additives; wherein the talcum has a D50 of less than 4 micron (ISO13317-3) and wherein the additives are selected from the group of polyethylenes (PEs), maleic anhydride grafted PEs (PE-MAs), maleic anhydride grafted PPs (PP-MAs), stabilizers, peroxides, calcium oxides (CaOs) or colorants.

In another embodiment the polymer composition consists of between 50-90 wt % of a recycled polypropylene, between 15-45 wt % of talcum and between 0.05-9 wt % of additives; wherein the talcum has a D50 of less than 4 micron (ISO13317-3) and wherein the additives are selected from the group of polyethylenes (PEs), maleic anhydride grafted PEs (PE-MAs), maleic anhydride grafted PPs (PP-MAs), stabilizers, peroxides, calcium oxides (CaOs) or colorants.

In another embodiment the polymer composition consists of between 55-85 wt % of a recycled polypropylene, between 15-45 wt % of talcum and between 0.05-9 wt % of additives; wherein the talcum has a 50 of less than 4 micron (ISO13317-3) and wherein the additives are selected from the group of polyethylenes (PEs), maleic anhydride grafted PEs (PE-MAs), maleic anhydride grafted PPs (PP-MAs), stabilizers, peroxides, calcium oxides (CaOs) or colorants.

In another embodiment the polymer composition consists of between 60-80 wt % of a recycled polypropylene, between 15-45 wt % of talcum and between 0.05-9 wt % of additives; wherein the talcum has a D50 of less than 4 micron (ISO13317-3) and wherein the additives are selected from the group of polyethylenes (PEs), maleic anhydride grafted PEs (PE-MAs), maleic anhydride grafted PPs (PP-MAs), stabilizers, peroxides, calcium oxides (CaOs) or colorants.

In another embodiment the polymer composition consists of between 50-90 wt % of a recycled polypropylene, between 20-40 wt % of talcum and between 0.05-9 wt % of additives; wherein the talcum has a D50 of less than 4 micron (ISO13317-3) and wherein the additives are selected from the group of polyethylenes (PEs), maleic anhydride grafted PEs (PE-MAs), maleic anhydride grafted PPs (PP-MAs), stabilizers, peroxides, calcium oxides (CaOs) or colorants.

In another embodiment the polymer composition consists of between 55-85 wt % of a recycled polypropylene, between 20-40 wt % of talcum and between 0.05-9 wt % of additives; wherein the talcum has a D50 of less than 4 micron (ISO13317-3) and wherein the additives are selected from the group of polyethylenes (PEs), maleic anhydride grafted PEs (PE-MAs), maleic anhydride grafted PPs (PP-MAs), stabilizers, peroxides, calcium oxides (CaOs) or colorants.

In another embodiment the polymer composition consists of between 60-80 wt % of a recycled polypropylene, between 20-40 wt % of talcum and between 0.05-9 wt % of additives; wherein the talcum has a D50 of less than 4 micron (ISO13317-3) and wherein the additives are selected from the group of polyethylenes (PEs), maleic anhydride grafted PEs (PE-MAs), maleic anhydride grafted PPs (PP-MAs), stabilizers, peroxides, calcium oxides (CaOs) or colorants.

In another embodiment the polymer composition comprises between 17.5-27.5 wt % of ash, preferably between 20-25 wt %.

In another embodiment the polymer composition can be used for injection molding of articles.

The polymer composition according to the invention may further comprise optional components different from the previously mentioned components of the polymer composition, such as additives, wherein the total of the previously mentioned components and the optional components is 100 wt % of the total polymer composition.

Accordingly, the invention relates to a polymer composition consisting of the previously mentioned components and the optional components.

It is noted that the invention relates to all possible combinations of features described herein, preferred in particular are those combinations of features that are present in the claims. It will therefore be appreciated that all combinations of features relating to the polymer composition according to the invention; all combinations of features relating to the process according to the invention and all combinations of features relating to the polymer composition according to the invention and features relating to the process according to the invention are described herein.

It is further noted that the term 'comprising' does not exclude the presence of other elements. However, it is also to be understood that a description on a product/polymer composition comprising certain components also discloses a product/polymer composition consisting of these components. The product/polymer composition consisting of these components may be advantageous in that it offers a simpler, more economical process for the preparation of the product/polymer composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

EXAMPLES

Quality Testing and Standards

For quality testing samples are taken during processing and from the end product. The Melt Mass-Flow Rate (MFR) is measured at day 3 and day 10 of ageing. The MFR and Melt Volume-Flow Rate (MVR) are assessed using the ISO 1133-1:2011, 2.16 kg, T=230° C.

The cold xylene solubles (CXS) is measured using the ISO 16152:2005, T=25° C.

The ash content of the polymer composition or product is measured using the ISO3451-1 2008.

The D50 of talc is determined from a particles size Distribution by Sedigraph, Sedimentation analysis, Stokes' Law according to ISO 13317-3.

The density of the polymer composition or product is measured using the ISO 1183-1:2012, T=23° C., tensile bar.

The tensile strength/test of the polymer composition or product is measured using the ISO 527-2:2012, T=23° C., II.

The flexural of the polymer composition or product is measured using the ISO 178:2010, T=23° C., II.

The tensile bar test of the molded articles from the polymer composition or product is measured using the ISO 527-2:2012.

The Charpy of the molded articles from the polymer composition or product is measured using the ISO 179-1: 2010 (T=−20° C. and T=23° C., II, molded bar 527/1A—notched) and ISO 179-1:2010 (T=−20° C. molded bar 527/1A unnotched).

The polydispersity was assessed using the polymer Labs 220 gel permeation chromatograph (GPC). The software used is Cirrus from PolyLab for molecular weights from GPC. The calibration of the HT-GPC uses a Hamielec type calibration with broad standard and fresh calibration with each sample set.

Extrusion products and injection-molded articles are produced and assessed following ISO19069-2:2016, ISO294-1:2017 and ISO294-3:2002.

Product Examples

Different samples have been produced with the following components: a recycled PP (flakes Pp recycled according to DSD324); Imerys Steamic talc and Imerys T1 DF (both having D50 of about 2 micron) and Luzenac 00s (D50 9.3 micron).

| Material | | CE A | CE B | 1 | 2 | 3 | 4 | 5 | 6 | 7 | 8 |
|---|---|---|---|---|---|---|---|---|---|---|---|
| | | | | | Sample | | | | | | |
| | | | | | Recipe | | | | | | |
| QCP DSD324 Flakes | | 99.25 | 93.7 | 95.8 | 93.8 | 89.8 | 79.8 | 95.8 | 93.8 | 89.8 | 79.8 |
| Imerys Steamic 00Sd | | | | | | | | 4.0 | 6.0 | 10.0 | 20.0 |
| Imerys T1DF | | | | 4.0 | 6.0 | 10.0 | 20.0 | | | | |
| Luzenac 00s (D50 9.3 micron) | | | 6 | | | | | | | | |
| Zebraflow T0318 | | 0.05 | 0.1 | | | | | | | | |
| AOx 30%: Schulman LAO 230 Q (30% Irganox B225) | | 0.7 | | | | | | | | | |
| Stabilization (Irganox B225) | | | | 0.2 | 0.2 | 0.2 | 0.2 | 0.2 | 0.2 | 0.2 | 0.2 |
| | | | | | Testing | | | | | | |
| Aging before testing (HDPE 3 d/PP 14 d) | days | 14 | 14 | 14 | 14 | 14 | 14 | 14 | 14 | 14 | 14 |
| Density ISO 1183 (T = 23° C.) | | — | | | | | | | | | |
| Density Average | kg/m³ | 912 | 949 | 942 | 956 | 981 | 1055 | 943 | 955 | 98 | 1055 |
| Melt Flow ISO 1133 (I 2.16; 230 C.) | | — | | | | | | | | | |
| MFR | g/10 min | 17.4 | 24.5 | 11.8 | 12.0 | 12.3 | 12.5 | 12.1 | 12.5 | 12.7 | 12.7 |
| MVR | ml/10 min | 22.9 | 31.3 | 15.2 | 15.5 | 15.3 | 14.3 | 15.6 | 16.0 | 15.7 | 14.5 |

-continued

| Material | | CE A | CE B | 1 | 2 | 3 | 4 | 5 | 6 | 7 | 8 |
|---|---|---|---|---|---|---|---|---|---|---|---|
| Meltdensity | g/ml | 0.76 | 0.783 | 0.776 | 0.774 | 0.804 | 0.874 | 0.776 | 0.781 | 0.809 | 0.876 |
| Ash Content compounds | — | | | | | | | | | | |
| Ash content | % | 1.27 | 7.49 | 6.25 | 8.35 | 11.97 | 21.80 | 6.09 | 8.03 | 11.93 | 21.44 |
| Charpy ISO 179/1eA molded bar 527/1A | date | | | | | | | | | | |
| Breaktype (C/P/N) Charpy impact 23° C. | — | CCCCC | CCCCC | CCCCC | CCCCC | CCCCC | CCCCC | CCCCC | CCCCC | CCCCC | CCCCC |
| Charpy impact 23° C. | kJ/m$^2$ | 5.29 | 3.29 | 4.84 | 4.38 | 4.14 | 3.61 | 4.75 | 4.59 | 4.13 | 3.75 |
| Breaktype (C/P/N) Charpy impact −20° C. | — | CCCCC | CCCCC | CCCCC | CCCCC | CCCCC | CCCCC | CCCCC | CCCCC | CCCCC | CCCCC |
| Charpy impact −20° C. | kJ/m$^2$ | 2.06 | 1.74 | 1.92 | 1.26 | 1.79 | 1.54 | 1.68 | 1.94 | 1.67 | 1.51 |
| Tensile ISO 527/1A (T = 23° C., II) | date | | | | | | | | | | |
| E-Modulus (Chord 0.05%-0.25%) | N/mm$^2$ | 1344 | 1309 | 1508 | 1600 | 1854 | 2411 | 1551 | 1670 | 1877 | 2441 |
| Tensile Strain at Break (Elongation at Break) | % | 87.7 | 15.5 | 54.6 | 28.1 | 10.8 | 8.5 | 33.0 | 67.1 | 11.4 | 8.9 |
| Tensile Strain at Yield (Elongation at yield) | % | 8.3 | 7.5 | 8.0 | 7.6 | 6.5 | 5.1 | 7.6 | 7.4 | 6.5 | 5.2 |
| Tensile stress at Break | N/mm$^2$ | 6.3 | 22.6 | 8.9 | 10.9 | 23.3 | 23.5 | 13.8 | 3.6 | 23.3 | 23.9 |
| Yield Stress | N/mm$^2$ | 28 | 26.2 | 28.2 | 27.8 | 27.8 | 27.8 | 28.1 | 28.3 | 28.0 | 28.2 |
| Flexural ISO 178 (T = 23° C., II) | date | | | | | | | | | | |
| Flexural modulus (secant) | Mpa | 1220 | 1270 | 1460 | 1590 | 1840 | 2510 | 470 | 1620 | 1840 | 2550 |
| Flexural strength | MPa | 32.8 | 32.2 | 34.5 | 35.9 | 37.4 | 40.6 | 35.1 | 36.3 | 37.3 | 41.7 |

What is claimed is:

1. A polymer composition, consisting of:
   50-96 wt % of a recycled polypropylene;
   4-50 wt % of talcum;
   0-10 wt % of additives; wherein the additives are selected from the group of PEs, PE-MAs, PP-MAs, stabilizers, peroxides, CaOs or colorants;
   wherein the talcum has a D50 of less than 4 micron (ISO13317-3) and wherein the wt % is relative to the total weight of the polymer composition,
   wherein the recycled PP is a material collected under a DSD 324 or DSD 324-1 standard,
   wherein the polymer composition has a modulus ranging between 1970-2600 MPa, determined using the ISO 527-2:2012, T=23° C.

2. The polymer composition according to claim 1, wherein the recycled polypropylene is present between 55-87.5 wt %.

3. The polymer composition according to claim 1, wherein the recycled polypropylene content of the polymer composition is made-up of between 25-75 wt % BOPP and between 75-25 wt % rubber-containing injection molded material; wherein wt % is relative to the total amount of recycled polypropylene.

4. The polymer composition according to claim 1, wherein the talcum is unmodified and present between 15-45 wt %.

5. The polymer composition according to claim 1, wherein the PE-MA, PE or PP-MA is present between 0.1-2 wt %.

6. The polymer composition according to claim 1, wherein the stabilizer is present between 0.01-2 wt %.

7. The polymer composition according to claim 1, wherein the peroxide is present between 2-10 wt % within a masterbatch, which is added between 0.05-2 wt % to the polymer composition.

8. The polymer composition according to claim 1, wherein the CaO is present between 0-2 wt %; wherein the colorant is present between 0.1-5 wt %.

9. The polymer composition according to claim 1, wherein the PE-MA, PE or PP-MA is present between 0.1-2 wt %.

10. The polymer composition according to claim 1, wherein the talcum has a D50 of less than 3 micron.

11. The polymer composition according to claim 1, wherein the polymer composition has a modulus ranging between 1970-2570 MPa determined using the ISO 527-2:2012, T=23° C.

12. The polymer composition according to claim 1, wherein the polymer composition has a Charpy notched impact strength of between 2.5-15.5 kJ/m2 determined using ISO 179-1:2010, T=23° C., II, molded bar 527/1A-notched.

13. The polymer composition according to claim 1, wherein the polymer composition has a melt flow rate MFR (230° C., 2.16 kg) of between 2.5-22.5 g/10 min and/or a MVR (230° C., 2.16 kg) of between 5-25 ml10 min; determined using ISO 1133-1:2011.

14. A process of making the polymer composition according to claim 1 comprises the steps of:
   a. treating a mixed polyolefin recyclate fraction with water without added thermal energy;
   b. treating the solution obtained mixed polyolefin recyclate fraction from a) in a washing step with an alkaline medium at a temperature of at least 60° C.;

c. sorting of the mixed polyolefin recyclate fraction solution obtained from b) obtaining a mixed PP recyclate fraction, wherein steps a) and b) can also be carried out in the reverse order;

d. treating the mixed PP recyclate fraction solution obtained from the above steps at a temperature in the range of between 50-155° C., for a period of at least 60 minutes;

e. adding the dried mixed PP recyclate fraction obtained from step d) to an extruder with the addition of talcum and additives; wherein the mix is processed to obtain a recycled PP and talcum material, wherein step e) is conducted between 200-250° C. for between 1-10 minutes.

15. Articles comprising the polymer composition according to claim 1, which are formed by injection molding.

16. The polymer composition according to claim 1, wherein the recycled polypropylene is present between 60-85 wt %, wherein the recycled polypropylene content of the polymer composition is made-up of between 25-75 wt % BOPP and between 75-25 wt % rubber-containing injection molded material; wherein wt % is relative to the total amount of recycled polypropylene, and wherein the talcum is unmodified and present between 20-40 wt %.

17. The polymer composition according to claim 16, wherein the PE-MA, PE or PP-MA is present between 0.2-1 wt %, wherein the stabilizer is present between 0.05-1.5 wt %, and wherein the peroxide is present between 2-10 wt % within a masterbatch, which is added between 0.05-2 wt % to the polymer composition.

18. The polymer composition according to claim 17, wherein the CaO is present between 0.05-1.5 wt %; wherein the colorant is present between 1-3 wt %, wherein the PE-MA, PE or PP-MA is present between 0.2-1 wt %, and wherein the talcum has a D50 of less than 2.5 micron.

19. The polymer composition according to claim 18, wherein the polymer composition has a modulus ranging between 2170-2370 MPa, determined using the ISO 527-2: 2012, T=23° C., wherein the polymer composition has a Charpy notched impact strength of between 3.5-10.5 kJ/m2; determined using ISO 179-1:2010, T=23° C., II, molded bar 527/1A-notched, and wherein the polymer composition has a melt flow rate MFR (230° C., 2.16 kg) of between 9.5-16.5 g/10 min and/or a MVR (230° C., 2.16 kg) of between 10-20 ml/10 min; determined using ISO 1133-1:2011.

20. A process of making the polymer composition according to claim 19 comprises the steps of:
a. treating a mixed polyolefin recyclate fraction with water without added thermal energy;
b. treating the solution obtained mixed polyolefin recyclate fraction from a) in a washing step with an alkaline medium at a temperature of at least 60° C.;
c. sorting of the mixed polyolefin recyclate fraction solution obtained from b) obtaining a mixed PP recyclate fraction, wherein steps a) and b) can also be carried out in the reverse order;
d. treating the mixed PP recyclate fraction solution obtained from the above steps at a temperature in the range of between 50-155° C., for a period of at least 60 minutes;
e. adding the dried mixed PP recyclate fraction obtained from step d) to an extruder with the addition of talcum and additives; wherein the mix is processed to obtain a recycled PP and talcum material, wherein step e) is conducted between 200-250° C. for between 1-10 minutes.

* * * * *